(12) United States Patent
Toner

(10) Patent No.: US 7,281,014 B2
(45) Date of Patent: Oct. 9, 2007

(54) METHOD AND APPARATUS FOR MOVING DATA BETWEEN STORAGE DEVICES

(75) Inventor: Stephen G. Toner, Sundance, UT (US)

(73) Assignee: Novell, Inc., Provo, UT (US)

( * ) Notice: Subject to any disclaimer, the term of this patent is extended or adjusted under 35 U.S.C. 154(b) by 456 days.

(21) Appl. No.: 10/413,957

(22) Filed: Apr. 14, 2003

(65) Prior Publication Data

US 2004/0205088 A1 Oct. 14, 2004

(51) Int. Cl.
*G06F 17/30* (2006.01)

(52) U.S. Cl. .................. 707/101; 707/203; 707/205

(58) Field of Classification Search .............. 707/1, 707/100, 200, 203–205, 101, 102; 711/162
See application file for complete search history.

(56) References Cited

U.S. PATENT DOCUMENTS

| | | | | |
|---|---|---|---|---|
| 4,467,421 A | * | 8/1984 | White ................... | 711/118 |
| 4,601,012 A | * | 7/1986 | Aiken, Jr. ............. | 714/15 |
| 4,853,843 A | * | 8/1989 | Ecklund ................ | 707/203 |
| 5,060,185 A | * | 10/1991 | Naito et al. ........... | 707/202 |
| 5,276,867 A | * | 1/1994 | Kenley et al. ......... | 707/204 |
| 5,367,698 A | * | 11/1994 | Webber et al. ......... | 709/203 |
| 5,423,018 A | * | 6/1995 | Dang et al. ........... | 711/159 |
| 5,537,585 A | * | 7/1996 | Blickenstaff et al. ... | 707/205 |
| 5,555,371 A | * | 9/1996 | Duyanovich et al. ... | 714/13 |
| 5,671,350 A | * | 9/1997 | Wood .................... | 714/15 |
| 5,812,748 A | * | 9/1998 | Ohran et al. ........... | 714/4 |
| 5,832,274 A | * | 11/1998 | Cutler et al. ........... | 717/171 |
| 5,875,479 A | | 2/1999 | Blount et al. | |
| 6,061,770 A | * | 5/2000 | Franklin ................ | 711/162 |
| 6,101,585 A | * | 8/2000 | Brown et al. .......... | 711/162 |
| 6,944,621 B1 | * | 9/2005 | Collart .................. | 707/102 |
| 2002/0049718 A1 | * | 4/2002 | Kleiman et al. ....... | 707/1 |
| 2003/0028737 A1 | | 2/2003 | Kaiya et al. | |

FOREIGN PATENT DOCUMENTS

EP 0 921 466 B1 6/2002

OTHER PUBLICATIONS

Edward R. Zayas "AFS-3 Programmer's Reference: Architectural Overview" Version 1.0 of Sep. 2, 1991 FS-00-D160 pp. 14.
Richard Campbell "Managing AFS® The Andrew File System" Prentice Hall PTR Upper Saddle River NJ 07458 at http://www.phptr.com 1998 pp. 103-106.
Cordrey et al., "Moving Large Filesystems On-Line, Including Exiting HSM Filesystems," *1999 Lisa XIII*, Seattle, WA (Nov. 7-12, 1999).

* cited by examiner

*Primary Examiner*—Don Wong
*Assistant Examiner*—Sheree N Brown
(74) *Attorney, Agent, or Firm*—Marger, Johnson & McCollom, P.C.

(57) ABSTRACT

System administrators are able to move data between volumes to better utilize system resources. As data is being moved, clients are able to access and modify the data from the source volume. The apparatus moves the data by repeatedly traversing the file system on the source volume and copying files to the destination volume. Modifications made by clients to the source volume are logged. Once the data has been moved the destination volume is updated with all client modifications.

30 Claims, 11 Drawing Sheets

METHOD AND APPARATUS FOR MOVING DATA BETWEEN STORAGE DEVICES

FIELD OF THE INVENTION

This invention relates to moving data between storage devices in a computer system, and more particularly to minimizing the time data is unavailable to consumers.

BACKGROUND OF THE INVENTION

Organizations and users have an ever-growing need to store data on computer networks. Often, system administrators expand existing systems with additional devices capable of meeting demands. To take advantage of network growth, and to generally improve the distribution of data storage, system administrators need the ability to move data between storage devices.

Currently, when moving data, system administrators have to deny users access to any of the data being moved. Denying access to data for any period of time is generally undesirable. And for large networks that contain vast amounts of mission-critical data that is vital to the operation of an organization, denying users access to data may result in adverse consequences.

Some techniques exist to alleviate this problem. For example, system administrators generally schedule operations that deny access to users during time periods when networks experience the least amount of traffic. As demands on networks increase, this technique becomes more problematic. For example, users may require uninterrupted access to data for a host of reasons specific to their operations. And as the amount of data on networks grows, the time required to process the data increases.

A need exists to provide users' access to files in the process of being moved, preferably in a manner that is both convenient and efficient. A solution that meets this demand would preferably address these problems and other problems associated with the prior art.

SUMMARY OF THE INVENTION

The invention is a method and apparatus for moving data from a source volume to a destination volume that minimizes the time files are unavailable to consumers. A system administrator issues a command to move files from a source volume to a destination volume. As the system moves files from the source volume to the destination volume, the system identifies files that could not be moved. The system also identifies files that have been modified (including created or deleted) after they were moved, so that the modifications can be replicated on the destination volume.

The foregoing and other features, objects, and advantages of the invention will become more readily apparent from the following detailed description, which proceeds with ten references to the accompanying drawings.

DETAILED DESCRIPTION OF THE PREFERRED EMBODIMENT

Figure 1:
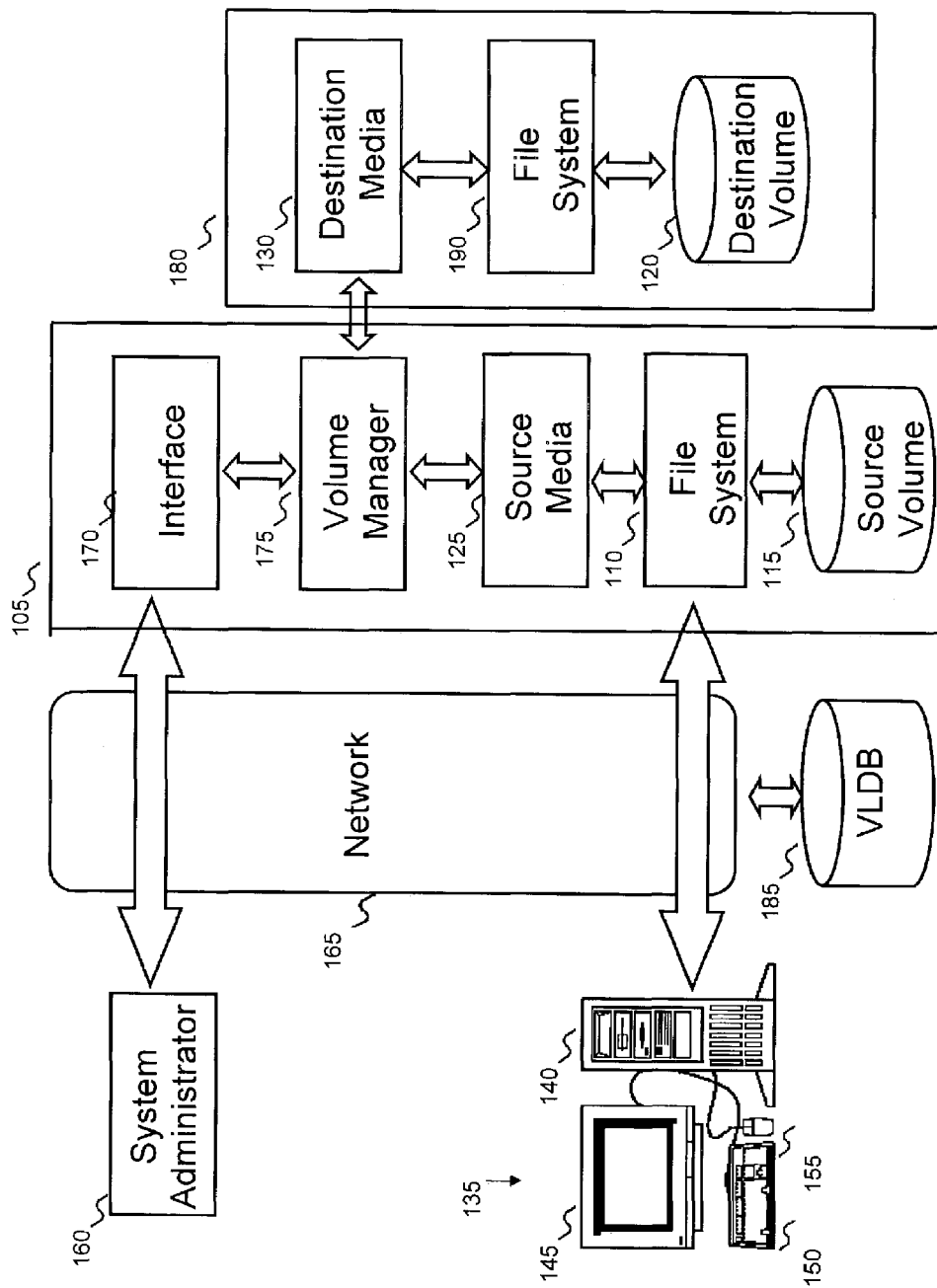
FIG. 1 is a block diagram of a computer system configured to move files from a source volume to a destination volume, according to an embodiment of the invention.

FIG. 1 shows a computer operative to move files from a source volume to a destination volume, according to an embodiment of the invention. In FIG. 1, computer 105 acts as a server, allowing others to access data. But a person skilled in the art will recognize that computer 105 does not have to be limited to a server, and can be any variety of devices capable of allowing others to access data.

Computer 105 includes file system 110, which manages the storage of data on source volume 115. FIG. Similarly, file system 190 manages the storage of data on destination volume 120. Volumes are stored on storage media such as source media 125 and destination media 130, and can also span multiple physical storage devices, if needed (for example, a storage area network (SAN)). Both source media 125 and destination media 130 can be physically within the box that is computer 105, or they can be remote from computer 105, as required. Also, both source volume 115 and destination volume 120 can be physically within the box that is computer 105, or they can be remote from computer 105, as required, and even in different computers. Typically, source volume 115 and source media 125 are contained on computer 105, but a person skilled in the art will recognize that source media 125 and source volume 115 can be on a computer other than computer 105.

In the server embodiment, a client, such as client 135, interacts with computer 105. Client 135 is shown as a desktop computer system, including computer 140, monitor 145, keyboard 150, and mouse 155, but a person skilled in the art will recognize that client 135 can take other forms. For example, client can be, among others, a dumb terminal, an Internet appliance, or a handheld computing device, with the accordant variations in configuration. FIG. 1 does not show additional components that can be part of client 135, such as a printer or other input/output devices, nor does FIG. 1 show the typical components that comprise client, such as the central processing unit, memory, local storage, etc.

A system administrator can use system administrator computer 160 to interact with computer 105. As with client 135, system administrator computer 160 can be any form of computer, and is not limited to using any particular embodiment of a computer. Typically, client 135 and system administrator computer 160 interact with computer 105 across a network, such as network 165. Network 165 can be any variety of network including, among others, a local area network (LAN), a wide area network (WAN), a global network (such as the Internet), and a wireless network (for example, using Bluetooth or any of the IEEE 802.11 standards). A person skilled in the art will recognize that client 135 and system administrator computer 160 can have a direct connection to computer 105, without crossing a network. System administrator computer 160 can also interact with computer 105 directly without using any type of intermediate computer or network.

Also connected to network 165 is volume location database (VLDB) 185. VLDB 185 associates volume names with a globally unique identifier (GUID) and the physical location of volumes. User requests for access to particular volumes are handled by referring to VLDB 185 in order to resolve the physical location of the volume requested.

System administrator computer 160 uses interface 170 to interface with volume manager 175 in computer 105. Interface 170 is responsible for translating messages between system administrator computer 160 and volume manager 175. Interface 170 processes two messages of interest from system administrator computer 160: volume move and volume split. Each of these actions is described below in turn.

When system administrator computer 160 issues a volume move command and specifies source and destination volumes, interface 170 transmits the command to volume manager 175. Volume manager 175 moves all data contained on the source volume, such as source volume 115, to the destination volume, such as destination volume 120. Typically, destination volume 120 is contained on a remote computer like computer 180, which acts as a server allowing others to access data. But a person skilled in the art will recognize that computer 180 does not have to be limited to a server and can be any variety of devices allowing others to access data. The volume manager 175 updates the VLDB 185 with the location of the destination volume. Updating VLDB 185 has the effect of directing user requests for files, previously obtained from the source volume, to the destination volume.

When system administrator computer 160 issues a volume split command and specifies source and destination volumes, system administrator computer 160 can also specify a folder of files contained on source volume 115 that will be moved to destination volume 120. Interface 170 transmits the commands of system administrator computer 160 to volume manager 175. Volume manager 175 moves the folder of files contained on source volume 115 to destination volume 120, and inserts a junction into source volume 115. A junction acts as a "link" between volumes, making the destination volume 120 appear as a subdirectory on source volume 115. The junction stores the GUID of destination volume 120 so that requests for files that were split to destination volume 120 can be satisfied, giving clients the appearance that nothing has changed on source volume 115.

During the split or move operation, client computers like client 135 can access files on source volume 115. Clients are able to perform all of the normal file system activities, including but not limited to creating, deleting, renaming, and modifying files. Building an apparatus that allows a system administrator to move data while, at the same time, permitting users to access the same data has inherent challenges. Some files might be open for writing by users and, as a result, possibly incapable of being accessed. Also, because users are able to modify file system data after a file is moved, those changes need to be logged to insure that they are accurately reflected on the destination volume. The volume manager obtains a list of logged files so that the destination volume can be updated with the modified files.

Figure 2:
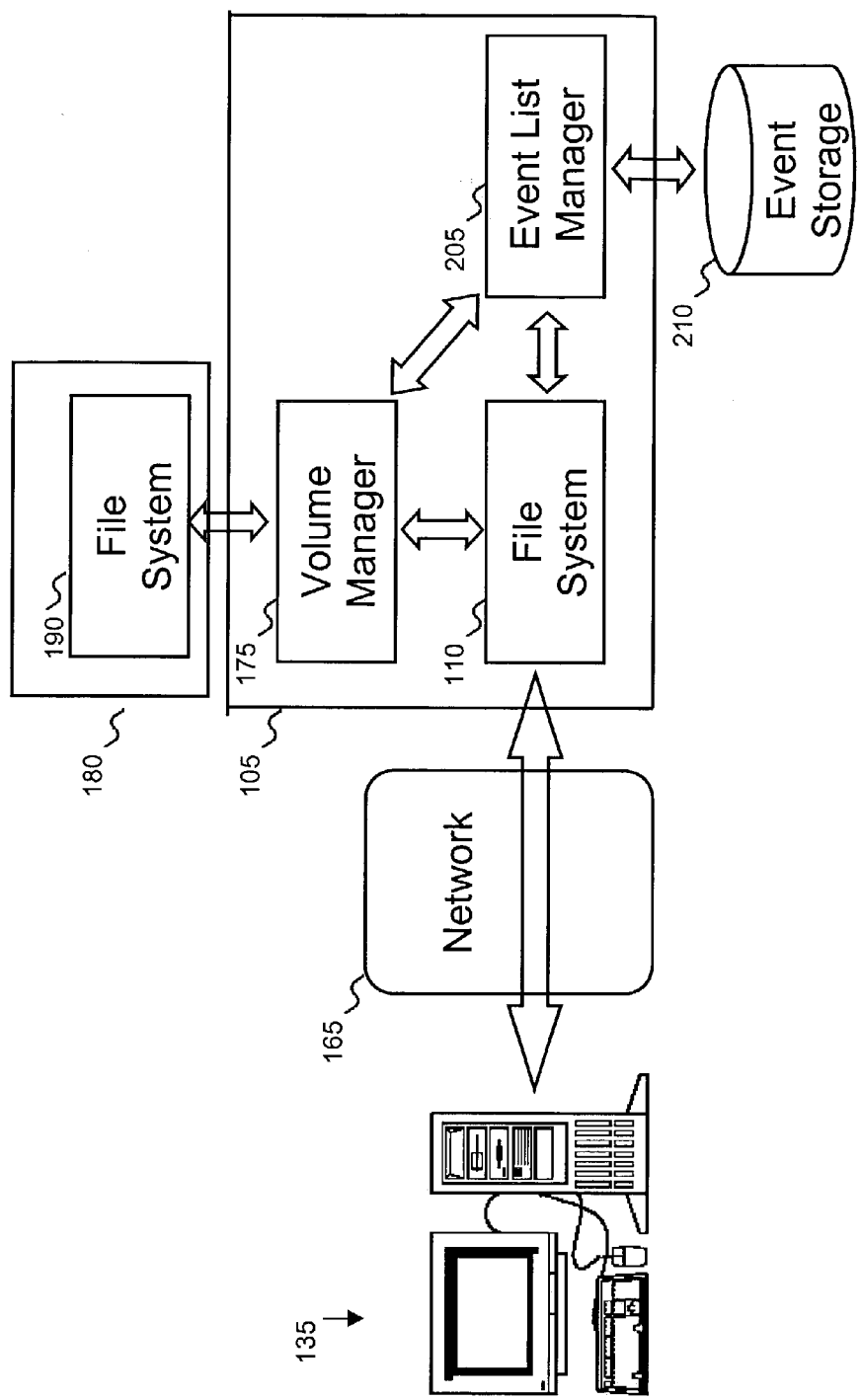
FIG. 2 shows the volume manager of FIG. 1 configured to obtain a list of files that are modified during an interval of interest.

FIG. 2 shows volume manager 175 configured to obtain a list of files that are modified during an interval of interest, according to an embodiment of the invention. U.S. patent application Ser. No. 10/283,960, filed Oct. 29, 2002, now pending and incorporated by reference herein, describes a system and method for managing events. As client 135 interacts with files managed by file system 110 of computer 105, the interactions generate events. For example, when client 135 saves a file to the file system 110, the act of saving the file is an event. Other common types of client-triggered events of interest include modifications to either the data or metadata of files, deletions of files, and renamings of files. Other events can occur without the involvement of a particular client. For example, a scheduled archive of files in file system 110 can change the metadata of the files, triggering events. File system 110 forwards these events to event list manager 205, which stores the events in event storage 210. Event list manager 205 is responsible for storing events as they are generated by file system 110 and responding to computer processes interested in receiving event lists. Volume manager 175 defines an interval of interest with event list manager 205 and receives a list of files that were modified during that interval of interest. Volume manager 175 uses the list received from event list manager 205 to transmit changes that occur on file system 110 to file system 190. In FIG. 2 file system 190 is shown in computer 180, but a person skilled in the art will recognize that file system 190 (and destination media 130, which is not shown in FIG. 2), can be part of computer 105.

In one embodiment, volume manager 175 uses file system read and write commands (typically in extensible Markup Language (XML)) to communicate with event list manager 205. In a second embodiment, volume manager sends a Simple Object Access Protocol (SOAP) XML stream to communicate with the event list manager. In either case, volume manager 175 sends a message to event list manager 205 that declares the start of an epoch and requests that events involving file modifications, including file deletion, renaming, and creation be associated with the epoch. Before the list of modified files may be obtained, the active epoch is closed. Volume manager 175 closes the active epoch with event list manager 205 by sending a message declaring the end of the epoch or a message beginning a new epoch. Once the epoch is closed, volume manager 175 sends a message to event list manager 205 requesting the list of modified files. In response, event list manager 205 sends a list of files that were associated with the epoch to volume manager 175. Further description of the method for obtaining a list of modified files from event list manager 205 is described below.

Although FIG. 2 shows event list manager 205 as part of computer 105, a person skilled in the art will recognize that event list manager 205 can be remote from computer 105. In other words, event list manager 205 can be operating on a computer distinct from computer 105, and which interacts with computer 105 either via a direct connection or across network 165.

Figure 3:
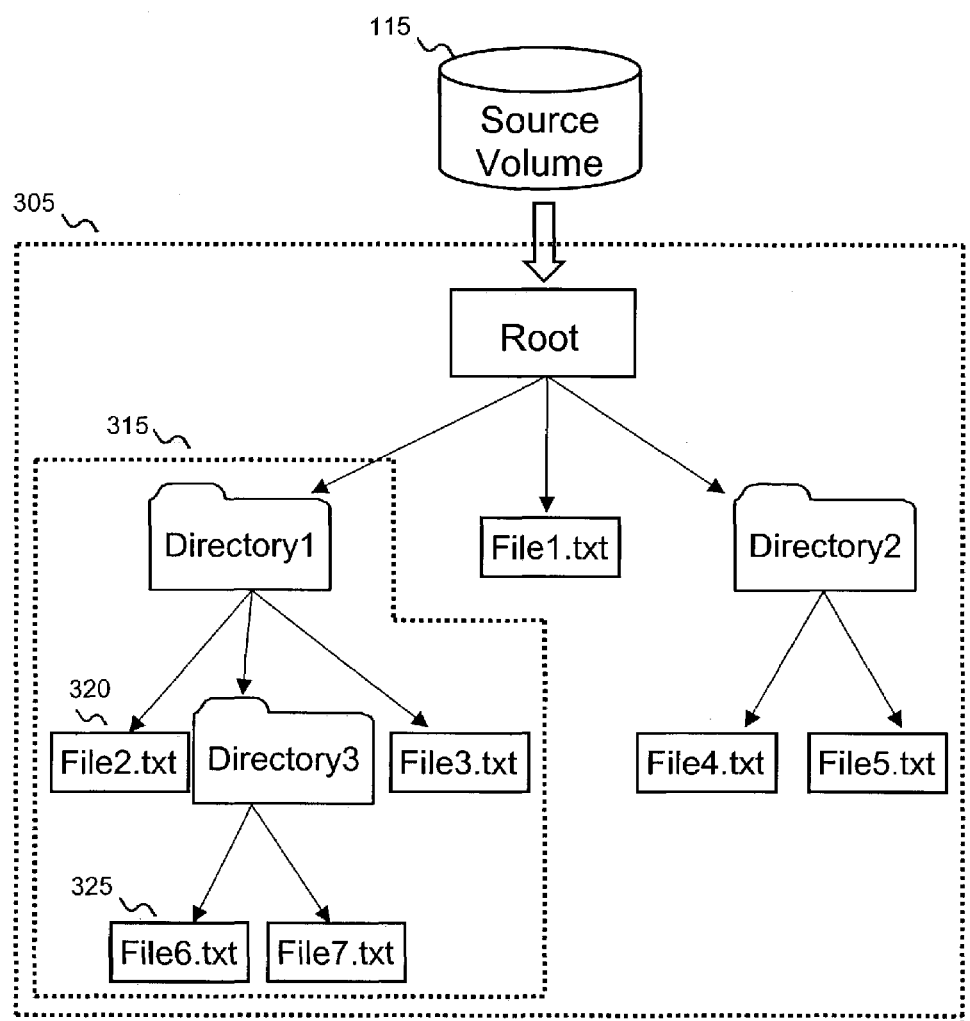
FIG. 3 shows a file system contained on the source volume of FIG. 1 prior to the start of a split operation.
Figure 4:
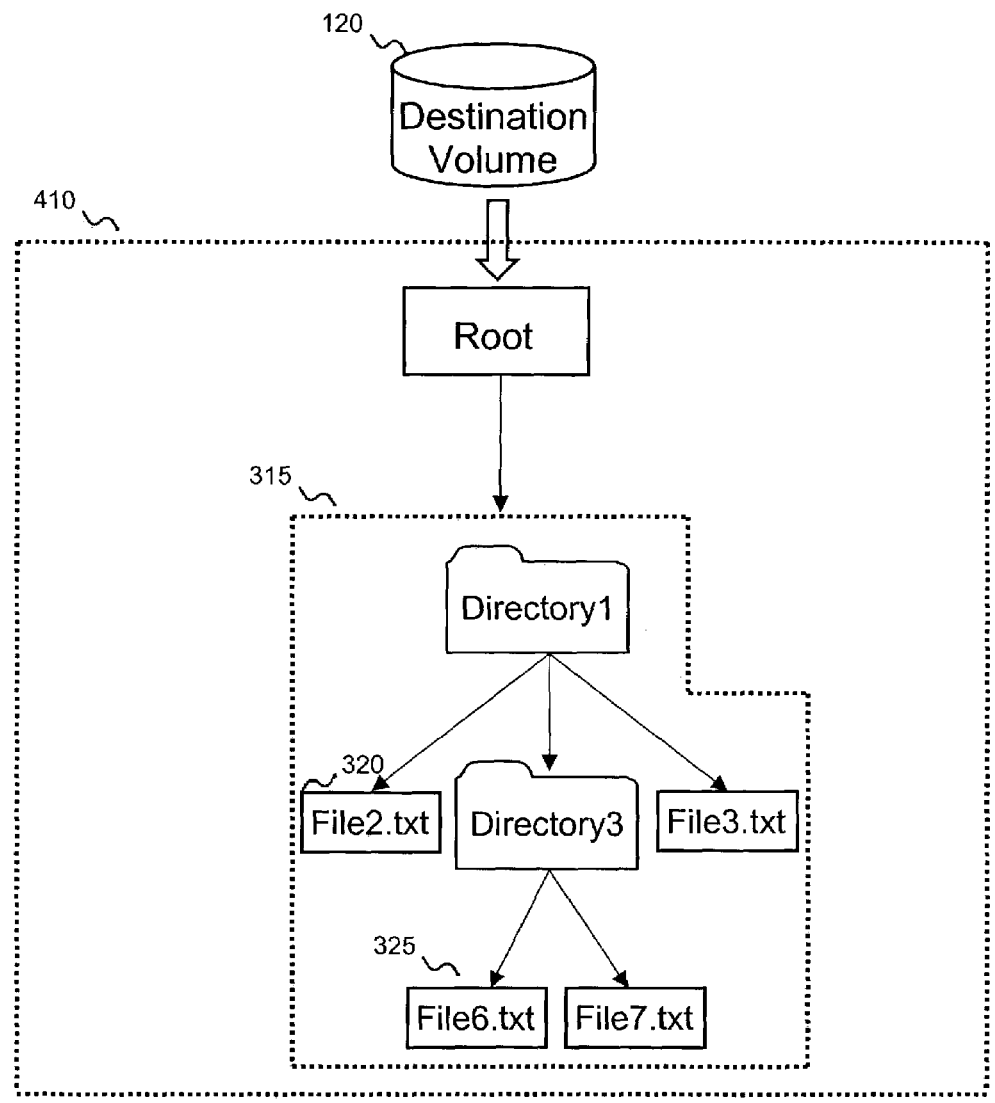
FIG. 4 shows a file system contained on the destination volume of FIG. 1 after a split operation, according to an embodiment of the invention.

FIG. 3 shows folder structure 305 contained on source volume 115 prior to the start of a split operation. Items on the source volume 115 subject to the split operation are contained in folder 315. All files, such as file2.txt 320, contained in folder 315 are to be moved from source volume 115 of FIG. 3 to destination volume 120 of FIG. 4. The contents of folder structure 410 on destination volume 120 after the split operation is complete are shown in FIG. 4. In this embodiment, the structure and hierarchy of folder 315 (FIG. 3) are the same on destination volume 120 (FIG. 4) as source volume 115 (FIG. 3).

The volume manager traverses the listings of folder 315 (FIG. 3) attempting to copy each file from source volume 115 (FIG. 3) to destination volume 120 (FIG. 4). During the traverse of the set of files subject to the split operation, the volume manager keeps two lists, discussed further below with reference to FIG. 5. A person skilled in the art will recognize that the two lists can use any of a number of different data structures capable of holding data. The first list identifies files that were not capable of being copied to the destination media (this can happen, for example, if the file is open for writing by a client). As the volume manager traverses folder 315 (FIG. 3), any file that cannot be copied is added to the first list of files. The second list contains files that are modified after the system's initial attempt to copy them. In one embodiment, further described below, the volume manager obtains the second list of files from the event list manager.

Figure 5:
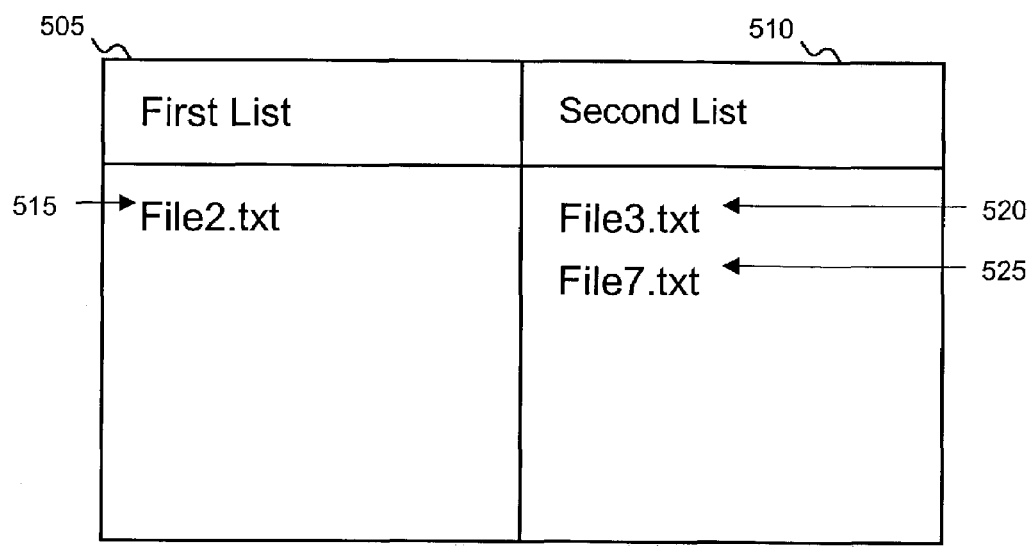
FIG. 5 shows an embodiment of two lists of files used during a split or move operation in the computer of FIG. 1.

FIG. 5 shows one possible embodiment of first list 505 and second list 510 of files after the volume manager has completed a traverse of folder 315 (FIG. 3) subject to the split operation. In FIG. 5, file2.txt 320 appears on the first list 505 of files because volume manager was not able to copy file2.txt 320 to the destination volume 120. Additional traverses or other procedures, as described below, are needed to copy file2.txt 320 and complete the split operation.

In FIG. 5, file3.txt 520 and file7.txt 525 appear on the second list 510 of files. The volume manager was able to copy both files to destination volume 120 during the traverse. However, both file3.txt 520 and file7.txt 525 were modified after the volume manager copied them. Modifications made to file3.txt 520 and file7.txt 525 are not accurately reflected on the destination volume 120 and additional traverses or other procedures, as described below, are needed to complete the split operation.

File6.txt 325 (FIG. 3) does not appear on either first list 505 or second list 510 of FIG. 5. It does not appear on first list 505 because the volume manager was able to copy it to destination volume 120, during the traverse. File6.txt 325 does not appear on the second list because modifications did not occur after it was copied to the destination volume. File6.txt 325 was moved without the need for any further procedures.

Figure 6:
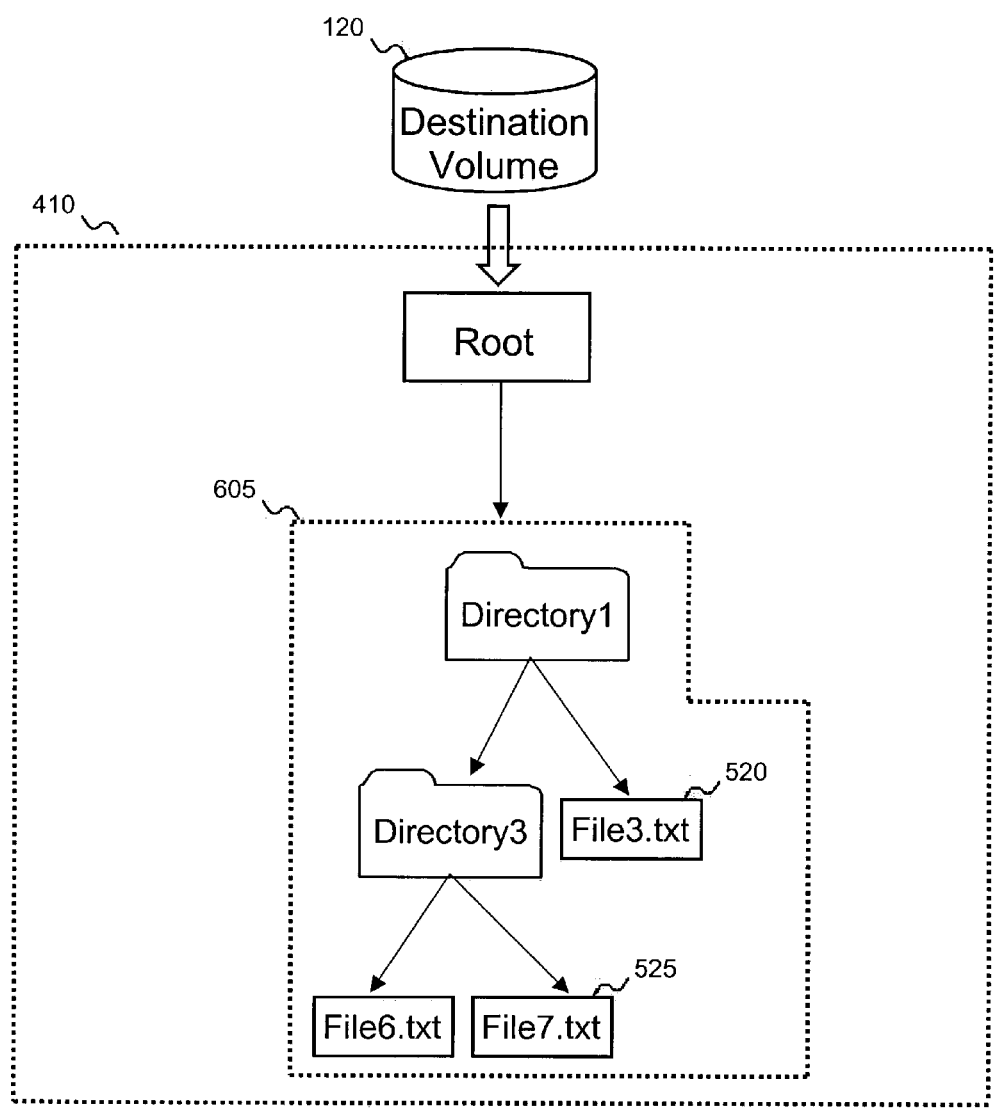
FIG. 6 shows a file system contained on the destination volume of FIG. 1 during a move or split operation.

FIG. 6 displays the folder 605 of destination volume 120 given the contents of the first and second list of files in FIG. 5. In FIG. 6, file2.txt does not appear on folder structure 410 of the destination volume 120 because the file has not yet been copied. In FIG. 6, file3.txt 520 and file7.txt 525 appear on the destination volume because both files were copied from the source volume. But since both file3.txt 520 and file7.txt 525 were modified after being copied, the versions of these files stored on destination volume 120 of FIG. 6 are not current.

Figure 7:
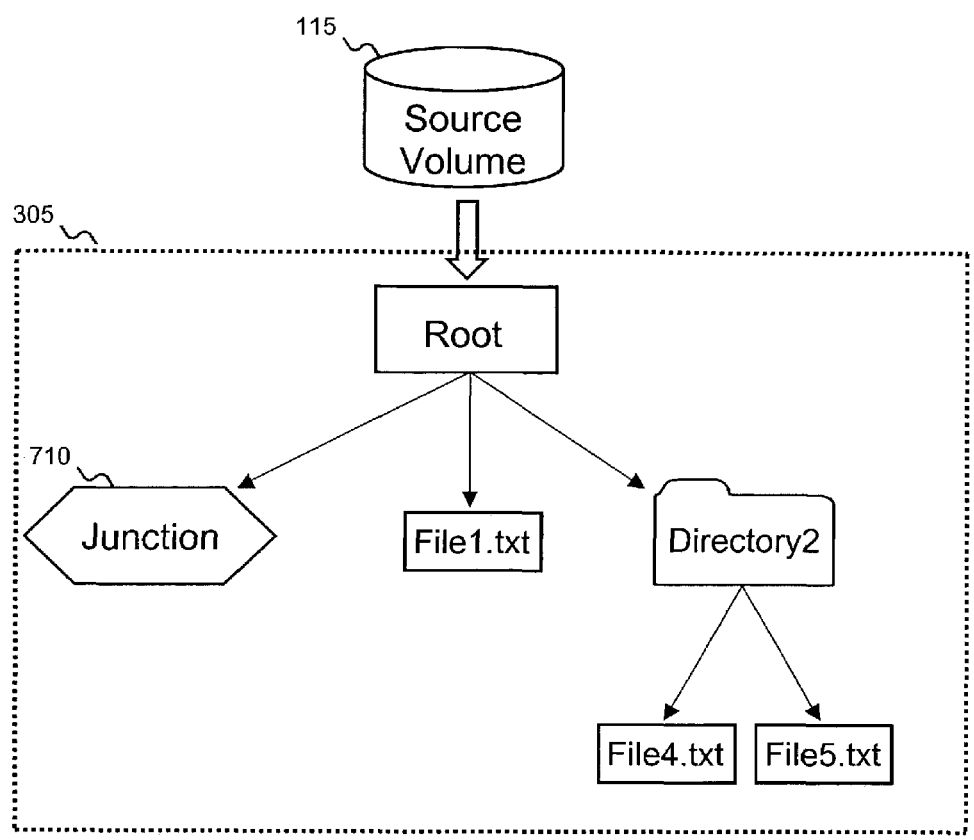
FIG. 7 shows a file system contained on the source volume of FIG. 1 after a split operation.

FIG. 7 shows source volume 115 and file system 305 after the split operation is complete. Volume manager places junction 710 into source volume 115 at the root of the folder that was split. As discussed earlier with reference to FIG. 1, a junction links one volume to a second volume. Junction 710 resolves user requests for files that were "split" by storing the GUID of the destination volume 120, thereby allowing the computer 105 to obtain the physical location of files requested. The use of junction 710 presents clients with the appearance that nothing has changed in source volume 115, even though a portion of the files in source volume 115 have been moved to destination volume 120.

Figure 8:
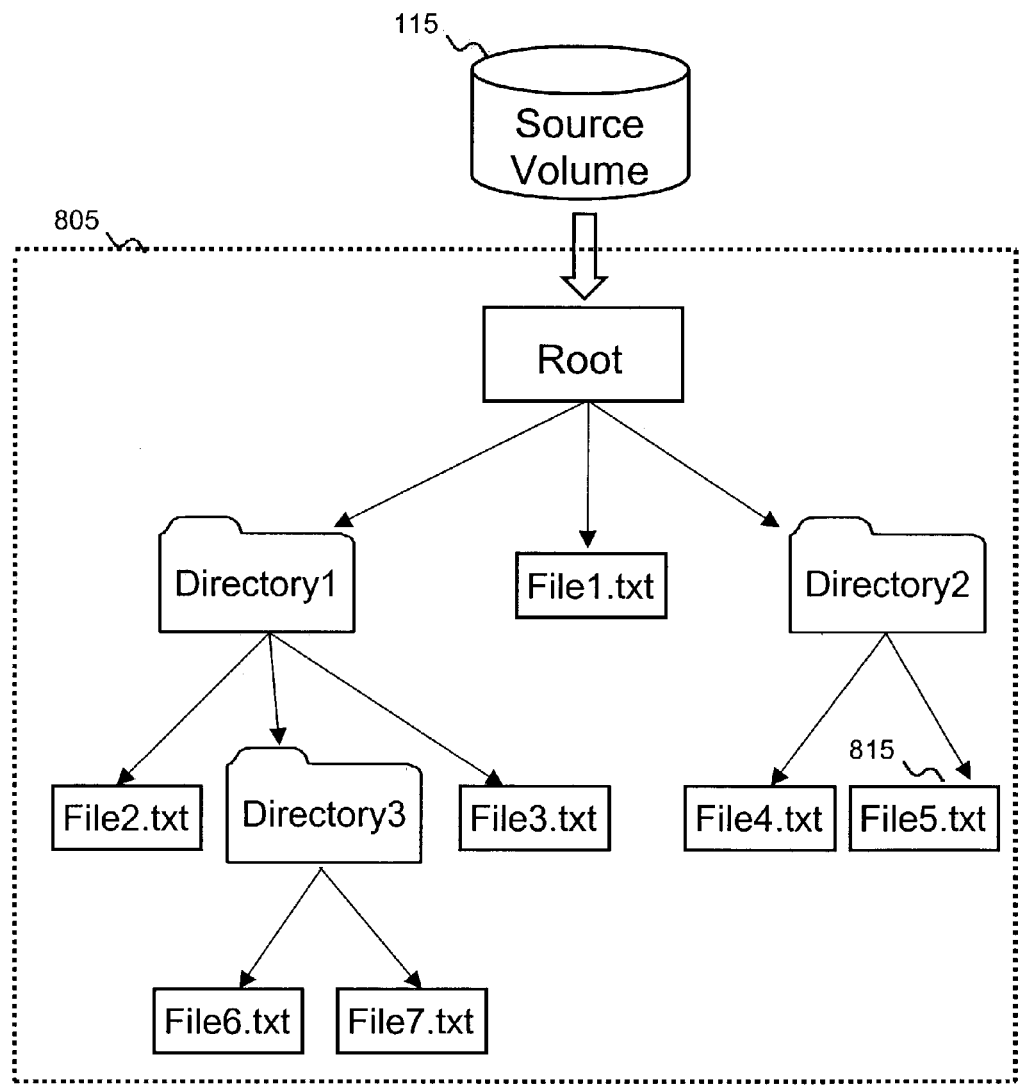
FIG. 8 shows a file system contained on the source volume of FIG. 1 prior to the start of a move operation.

FIG. 8 shows folder structure 805 contained on source volume 115 prior to a move operation. All files, such as file5.txt 815, will be moved from source volume 115 of FIG. 8 to destination volume 120 of FIG. 9. The contents of the destination volume after the move operation is complete are shown in folder structure 905 of FIG. 9. In this embodiment, the structure and hierarchy of folder structure 805 (FIG. 8) are the same on destination volume 120 (FIG. 9) as source volume 115 (FIG. 8).

Figure 9:
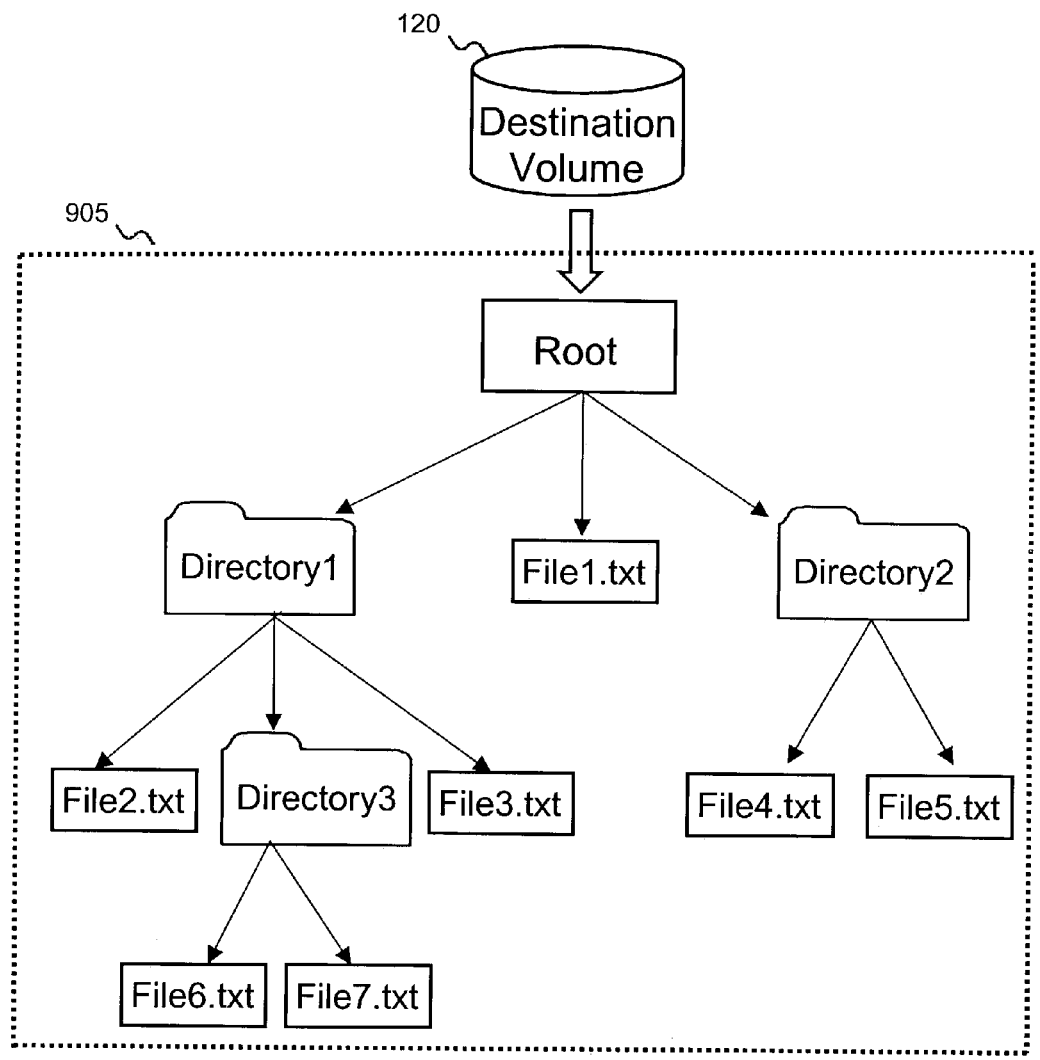
FIG. 9 shows a file system contained on the destination volume of FIG. 1 after the start of the move operation of FIG. 8.

In both the volume move and volume split operations, the technique for copying files is the same. As described above with reference to a volume split (FIG. 3 and FIG. 4), the volume manager keeps two lists of files (see FIG. 5) when traversing a directory subject to a volume move operation. The first list identifies files that were not capable of being copied to destination volume 120 (FIG. 9). The second list contains files that were modified after the volume manager's initial attempt to copy them from source volume 115 (FIG. 8) to destination volume 120 (FIG. 9). If a file appears on either list, than additional traverses or other procedures are required to complete the move or split operation.

Even though the technique for copying files is the same in a volume split and volume move there are differences between the two operations. In a volume move the entire contents of a volume are moved, whereas in a volume split only involves moving a folder of a volume. Also, in a volume split, after the "move" portion of the operation is complete, the volume manager places a junction into the source volume at the root of the subdirectory tree that was moved.

Figure 10A:
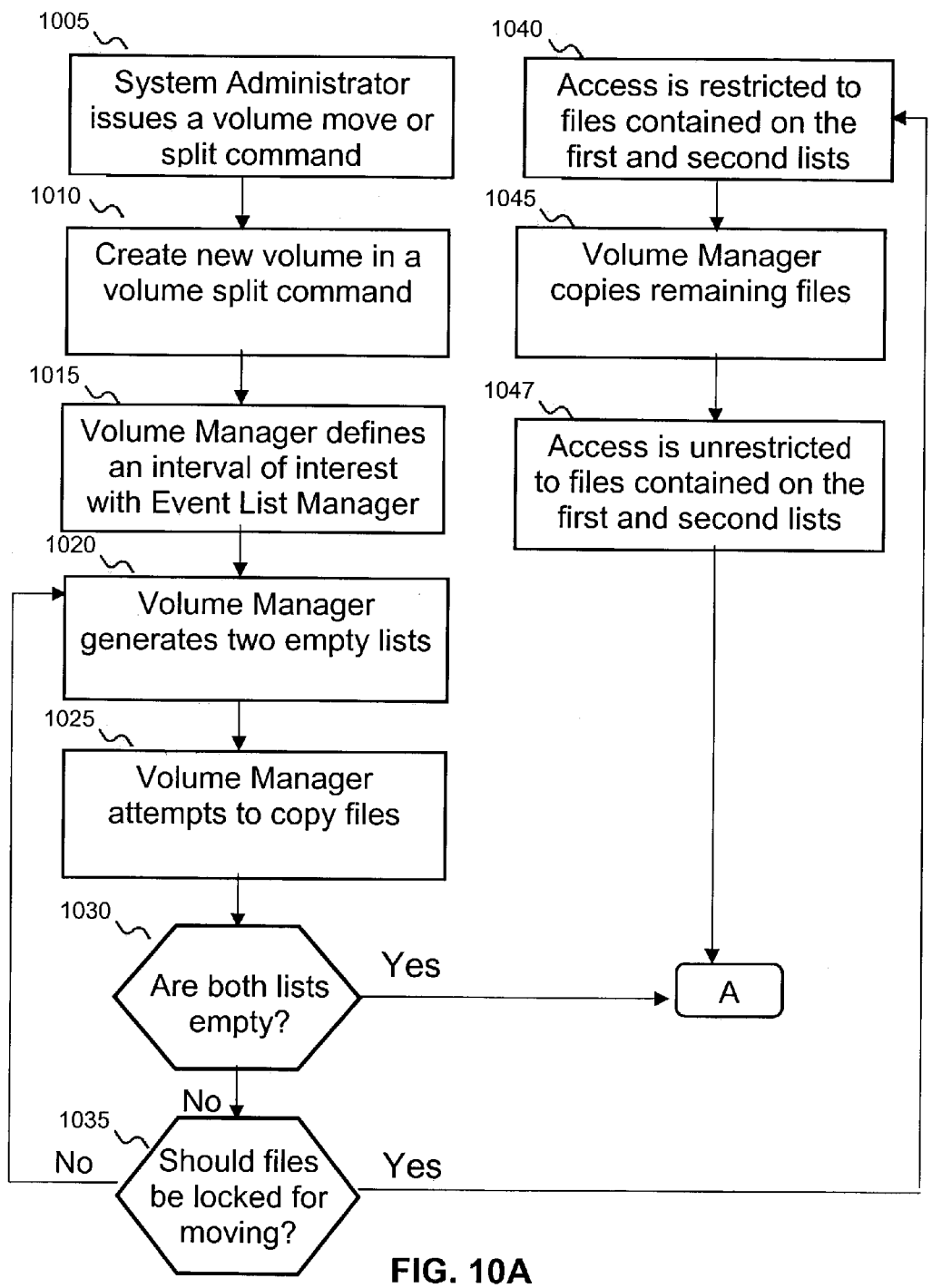
FIGS. 10A-10B show a flowchart of the procedures for copying a set of files from the source volume to the destination volume of FIG. 1, while allowing consumers access to files on the source volume.
Figure 10B:
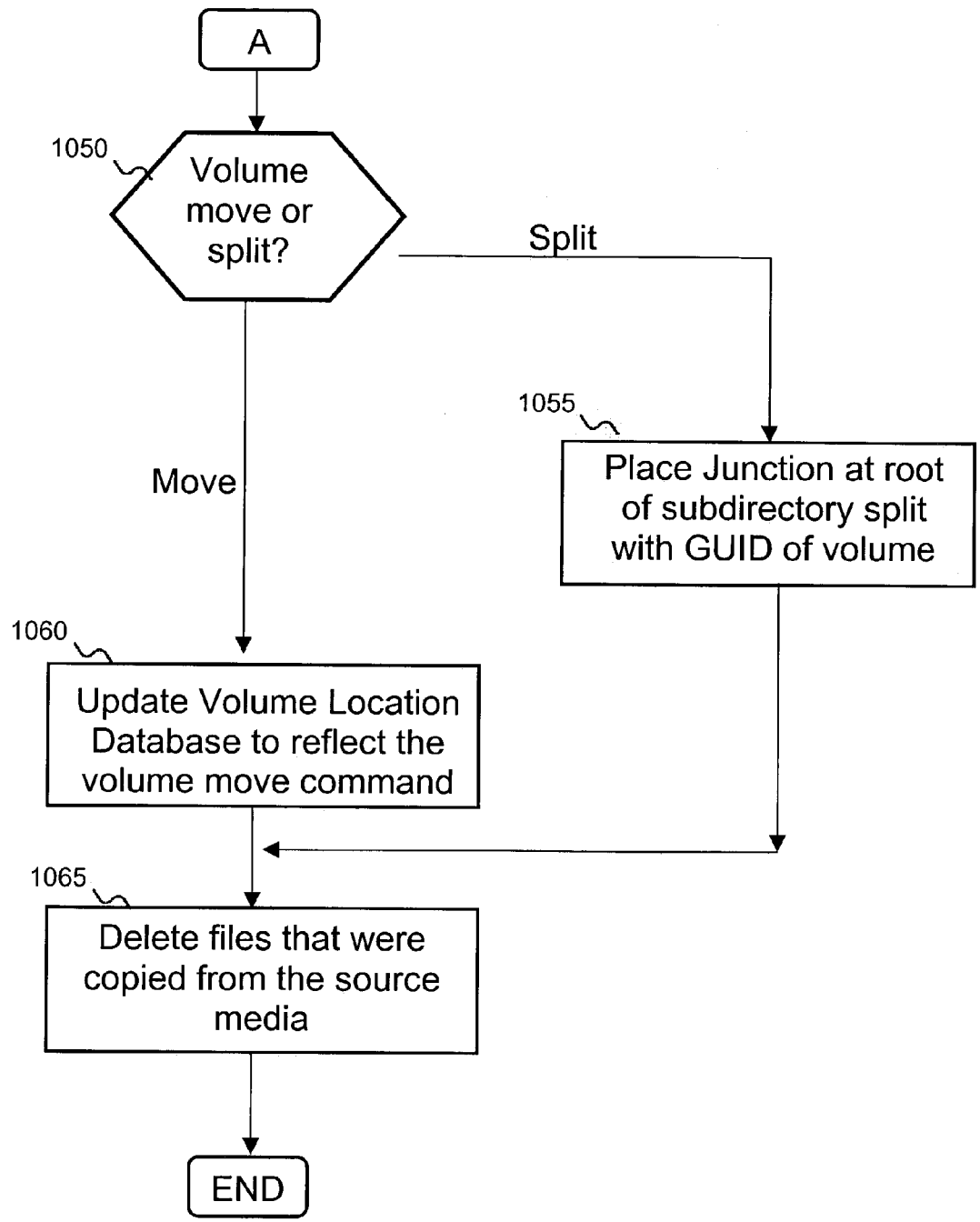

FIGS. 10A-10B show a flowchart of the procedure for copying files from the source volume to the destination volume of computer in FIG. 1, according to an embodiment of the invention. In FIG. 10A at step 1005, a system administrator issues either a volume move or volume split command, which is transmitted to volume manager from the interface of computer in FIG. 1.

At step 1010 (FIG. 10A), the volume manager determines whether the command is a volume split or a volume move. If the command is a volume split, the volume manager creates a destination volume that will be responsible for managing the files subject to the split operation. Creating the destination volume includes assigning a GUID and associating the GUID with the physical location of the destination volume in the VLDB.

Note that in the case of a volume move, step 1010 is not performed. Instead, the VLDB is updated at step 1060 (FIG. 10B). The reason that the VLDB is not updated at step 1010 in the case of a volume move is that for a volume move, the volume name is not changed. Thus, if the destination volume were added to the VLDB before the source volume was removed, the VLDB would list two different possible volumes for a volume request. Requests to access the volume by name might be directed to the destination volume, which might not yet have the desired file (or might have an out-of-date version of the file). Instead, the files are copied to the destination volume before the VLDB is updated, and the VLDB is updated only when the volume move operation is complete.

At step 1015 (FIG. 10A), the volume manager defines an interval of interest with the event list manager. As described previously, the event list manager is responsible for storing events as they are generated by a file system and responding to computer processes interested in receiving event lists. The volume manager defines an interval of interest with the event list manager in which files that are modified, created, renamed, or deleted are added to the second list of files created in step 1020 (FIG. 10A). In one embodiment, the volume manager declares an epoch with the event list manager. Then, after a first pass has been made over the files to be moved, the volume manager can request from the event list manager events specifying files that have been modified since the epoch was declared.

In FIG. 10A at step 1020, volume manager creates two empty lists capable of storing data as described above.

In step 1025 the volume manager traverses the directory of files subject to a system administrator's move or split command attempting to copy each file from the source volume to the destination volume. The file duplications can be accomplished using file system Application Program Interfaces (APIs), although a person skilled in the art will recognize that other techniques can be used to copy the files. The volume manager determines whether each file is capable of being copied and copies files whose transmission is permitted. Each file that is not capable of being copied is added to the first list of files.

At some point, the second list is populated with files that have been modified during the interval of interest (see step 1015). A person skilled in the art will recognize that there are a variety of ways to populate the second list. In one embodiment, the volume manager requests events from the event list manager, and populates the second list with all files that were modified during the interval of interest. In this embodiment, some files on the second list could have been modified before the volume manager copied them. These files will be copied again even though all modifications are accurately reflected on the destination media. However, additional resources expended on these files is not significant because they are few in number. In a second embodiment, the event list manager updates the second list automatically with the files that were modified after the volume manager attempted to copy them. The event list manager obtains the time for the attempted duplication of each file from the volume manager. The time for the attempted duplication is compared to the time of the last event for each file. Through this comparison, the event list manager is able to populate the second list with files that were only modified after the volume manager's attempt to copy them. In a third embodiment, the volume manager populates the second list with files that were modified after the attempt to copy them. The volume manager obtains the time of the last event for each file from the event list manager. The time obtained from the event list manager is compared to the time the volume manager attempted to duplicate the file. Through this comparison, the volume manager is able to populate the second list with files that were modified after the volume manager's attempt to copy them.

In FIG. 10A at step 1030, volume manager examines the most recent instances of the first and second lists for entries. If both lists are empty, the process of copying files from the source volume to the destination volume (FIG. 1) is complete, as all files subject to the move or split operation have been copied. The process can then continue with step 1050 of FIG. 10B.

Returning to FIG. 10A, if there is at least one file in one of the lists, then at step 1035, the volume manager determines whether another traverse over the files subject to the move or split operation is needed. In one embodiment, the volume manager determines whether files were moved during the last traverse at step 1025. The volume manager uses a counter to determine the number of files that were copied during the last traverse. If the volume manager finds that additional files were not copied on the last traverse then it proceeds back to step 1020. However, a person skilled in the art will recognize that there are a number of ways to determine whether files were moved during a traverse of the file system. For example, the two lists can be examined to see if any files remain in the lists. The process for copying the remaining files is the same as described above for files that were previously copied, although the set of files to be copied is shorter.

In FIG. 10A at step 1035, if the volume manager determines that attempting to copy the files without locking out clients will not be useful, then further procedures are required to copy the remaining files. For example, if a file is left open for writing on a client computer for an extended period of time, repeatedly trying to copy the file will not help. In one embodiment, at step 1040 client access to files that are on the first and second lists is restricted. As a result, all remaining files are capable of being copied. In FIG. 10A at step 1045, the volume manager traverses the file system and copies all files that appear on the most recent instances of the first and second lists. After completion of step 1045 (FIG. 10A), all files subject to the move or split operation have been copied, and at step 1047 (FIG. 10A) the files are unlocked. The process can then continue with step 1050 of FIG. 10B.

Once all files subject to the move or split operation have been copied, client requests for files are directed to the destination volume. In FIG. 10B at step 1050, the volume manager determines if the system administrator issued a volume move or volume split command.

If the operation is a volume split, then at step 1055, the volume manager places a junction that contains the GUID of the destination volume into the source volume at the root of the subdirectory tree that was moved. As mentioned above, the use of a junction presents clients with the appearance that nothing has changed in the volume, even though a portion of the files in the source volume have been moved to the destination volume. Clients are able to access files on the subdirectory tree moved because a junction uses the GUID to direct client requests for the moved files to the destination volume.

If the operation is a volume move, the volume manager proceeds to step 1060 and updates the VLDB to reflect the move command. In a volume move, the entire contents of a volume are copied from the source volume to the destination volume. As described above with reference to FIG. 1, the VLDB associates volumes with their physical location on a storage device. Client requests for files are resolved by obtaining the physical location of the volume, that contains the files requested from the VLDB. To direct requests for files to the destination volume, the volume manager updates the VLDB changing the location of the source volume to that of the destination volume.

Once client requests for files are directed to the destination volume, the files subject to the move or split operation are deleted from the source volume. In FIG. 10B at step 1065, volume manager deletes file system data from the source volume. The resources used by the moved files are now free to store other data. In one embodiment, file system data is deleted as a background process. But a person skilled in the art will recognize that the deletion of file system data can be completed in any variety of ways.

A person skilled in the art will recognize that the flowchart shown in FIGS. 10A-10B is one of many different sequences of steps that can be used to achieve the same results. For example, step 1065 (FIG. 10B) can be performed separately from the previous steps, possibly as part of regular system maintenance of deleting unnecessary files after a designated period of time.

A person skilled in the art will recognize that an embodiment of the invention described above may be implemented using a suitably programmed computer. In that case, the method is embodied as instructions that comprise a program (in this case, instructing a central processing unit how to execute other programs). The program may be stored on computer-readable media, such as floppy disks, optical disks (such as compact discs), fixed disks (such as hard drives), random access memory (RAM), read-only memory (ROM), or flash memory. The program may then be executed on a computer to implement the method. A person skilled in the art will also recognize that an embodiment of the invention described above may include a computer-readable modulated carrier signal, and that the program, or portions of its execution, may be distributed over multiple computers in a network.

Having illustrated and described the principles of the invention in an embodiment thereof, it should be readily apparent to those skilled in the art that the invention may be modified in arrangement and detail without departing from such principles. All modifications coming within the spirit and scope of the accompanying claims are claimed.

The invention claimed is:

1. A system for moving data, comprising:
    a first computer including a first storage media;
    a first volume on the first storage media, the first volume including a set of files, the set of files including at least one file;
    a second computer including a second storage media;
    a second volume on the second storage media;
    a file duplicator to duplicate the set of files from the first volume to the second volume while permitting user access to at least one file in the set of files on the first volume;
    a first subset of files from the set of files on the first volume that were opened for writing and could not be successfully duplicated to the second volume;
    a second subset of files from the set of files on the first volume that have been modified after duplication to the second volume and need to be reduplicated to the second volume; and
    a volume manager that manages the first subset of files and the second subset of files.

2. A system according to claim 1, further comprising an event list manager to identify the files for the second subset of files.

3. A system according to claim 1, wherein the volume manager is operative to use the file duplicator to duplicate at least one file from the set of files on the first volume to the second volume.

4. A system according to claim 3, wherein the volume manager is operative to duplicate at least a second file in one of the first subset of files and the second subset of files from the first volume to the second volume.

5. A system according to claim 1, further comprising a junction linking the second volume to the first volume.

6. A system according to claim 1, further comprising a volume location database storing a location of the first volume and a location of the second volume.

7. A system according to claim 1, further comprising an interface with the first computer wherein the interface enables a system administrator to select the first volume and second volume and to select the set of files contained on the first volume to duplicate using the file duplicator.

8. A system according to claim 7, wherein the second computer includes the interface.

9. A computer-implemented method for moving files comprising:
    identifying a source volume;
    identifying a destination volume;
    attempting to duplicate a set of files from the source volume to the destination volume while permitting a client to access at least one file in the set of files on the source volume;
    identifying a first subset of files, the first subset of files including at least one file that were opened for writing and could not be duplicated from the source volume to the destination volume;
    identifying a second subset of files, the second subset of files including at least one file that has been updated since the files were successfully duplicated from the source volume to the destination volume;
    managing the first subset of files and the second subset of files by a volume manager; duplicating the files in the first subset of files and the second subset of files to the destination volume;
    automatically redirecting requests for files in the set of files from the source volume to the destination volume; and
    deleting all files in the set of files from the source volume.

10. A computer-implemented method according to claim 9, wherein duplicating the files in the first subset of files and the second subset of files to the destination volume includes:
    establishing a third subset of files including the files in the first subset of files and the files in the second subset of files;
    removing the files from the first subset of files and removing the files from the second subset of files;
    attempting to duplicate the files in the third subset of files from the source volume to the destination volume while permitting the client to access at least one file from the third subset of files;
    identifying any files that were opened for writing and could not be duplicated to the destination volume, and adding these files to the first subset of files; and
    identifying any files that have been updated since the files were duplicated to the destination volume, and adding these files to the second subset of files.

11. A computer-implemented method according to claim 9, wherein duplicating the files in the first subset of files and the second subset of files to the destination volume includes:
    establishing a third subset of files, the third subset of files including the files in the first subset of files and the files in the second subset of files;
    restricting client access to the files in the third subset; and
    duplicating the files in the third subset of files to the destination volume.

12. A computer-implemented method according to claim 9, wherein attempting to duplicate a set of files from the source volume includes using a file system Application Program Interface (API) to access the set of files.

13. A computer-implemented method according to claim 9, wherein creating a second subset of files includes adding any files that have been renamed, modified, or created to the second subset of files.

14. A computer-implemented method according to claim 13, wherein creating a second subset of files further includes adding any files that have been deleted to the second subset of files.

15. A computer-implemented method according to claim 14, wherein duplicating the files in the second subset of files to the destination volume includes duplicating any file deletions.

16. A computer-implemented method according to claim 9, wherein automatically redirecting requests for files in the set of files from the source volume to the destination volume includes determining if the volume manager is completing a volume move or a volume split.

17. A computer-implemented method according to claim 16, further comprising replacing files from the source volume that are duplicated to the destination volume with a junction operative to link the destination volume to the source volume if the volume manager is completing a volume split.

18. A computer-implemented method according to claim 9, wherein automatically redirecting requests for files further includes revising an entry in a volume location database for at least one file from the source volume to the destination volume.

19. An article comprising a machine-accessible medium having associated data that, when accessed, results in a machine:
   identifying a source volume;
   identifying a destination volume;
   attempting to duplicate a set of files from the source volume to the destination volume while permitting a client to access at least one file in the set of files on the source volume;
   identifying a first subset of files, the first subset of files including at least one file that was opened for writing and could not be duplicated from the source volume to the destination volume;
   identifying a second subset of files, the second subset of files including at least one file that has been updated since the files were successfully duplicated from the source volume to the destination volume;
   managing the first subset of files and the second subset of files by a volume manager;
   duplicating the files in the first subset of files and the second subset of files to the destination volume;
   automatically redirecting requests for files in the set of files from the source volume to the destination volume; and
   deleting all files in the set of files from the source volume.

20. An article according claim 19, having further associated data wherein directing requests for files in the set of files from the source volume to the destination volume includes:
   establishing a third subset of files from the first subset of files and the second subset of files;
   clearing the first subset of files and the second subset of files;
   attempting to duplicate the files in the third subset of files from the source volume to the destination volume while permitting the client to access at least one file from the set of files;
   identifying any files that were opened for writing and could not be duplicated to the destination volume, and adding these files to the first subset of files; and
   identifying any files that have been updated since the files were duplicated from the source volume to the destination volume, and adding these files to the second subset of files.

21. An article according claim 19, having further associated data wherein directing requests for files in the set of files from the source volume to the destination volume includes:
   establishing a third subset of files including the files in the files in the first subset of files and the files in the second subset of files;
   restricting access to the files in the third subset of files; and
   duplicating the files in the third subset of files to the destination volume.

22. An article according to claim 19, having further associated data wherein attempting to duplicate a set of files from the source volume includes using a file system Application Program Interface (API) to access the files in the set of files.

23. An article according to claim 19, having further associated data wherein identifying the second subset of files includes identifying all files in the set of files that have been renamed, modified, or created.

24. An article according to claim 23, having further associated data wherein identifying the second subset of files further includes identifying all files in the set of files that have been deleted.

25. An article according to claim 24, having further associated data wherein duplicating the files in the second subset of files to the destination volume includes duplicating the file deletions.

26. An article according to claim 19, having further associated data wherein automatically redirecting requests for files in the set of files from the source volume to the destination volume includes determining if the volume manager is completing a volume move or a volume split.

27. An article according to claim 26, having further associated data that, when accessed, result in the machine replacing files from the source volume that are duplicated to the destination volume with a junction operative to link the destination volume to the source volume if the volume manager is completing a volume split.

28. An article according to claim 26, having further associated data that, when accessed, result in the machine revising an entry in a volume location database to direct requests for at least one file from the source volume to the destination volume.

29. A system according to claim 1, wherein the first computer is the second computer.

30. A system according to claim 6, wherein the location of the first volume in the volume location database associates a name for the first volume with a globally unique identifier for the first volume and a physical location of the first volume.

* * * * *